July 15, 1930.　　　　P. VON RADOLIN　　　　1,770,636
APPARATUS FOR THE DESTRUCTIVE DISTILLATION
OF CEREAL HUSKS AND OTHER VEGETABLE WASTE
Filed May 19, 1923
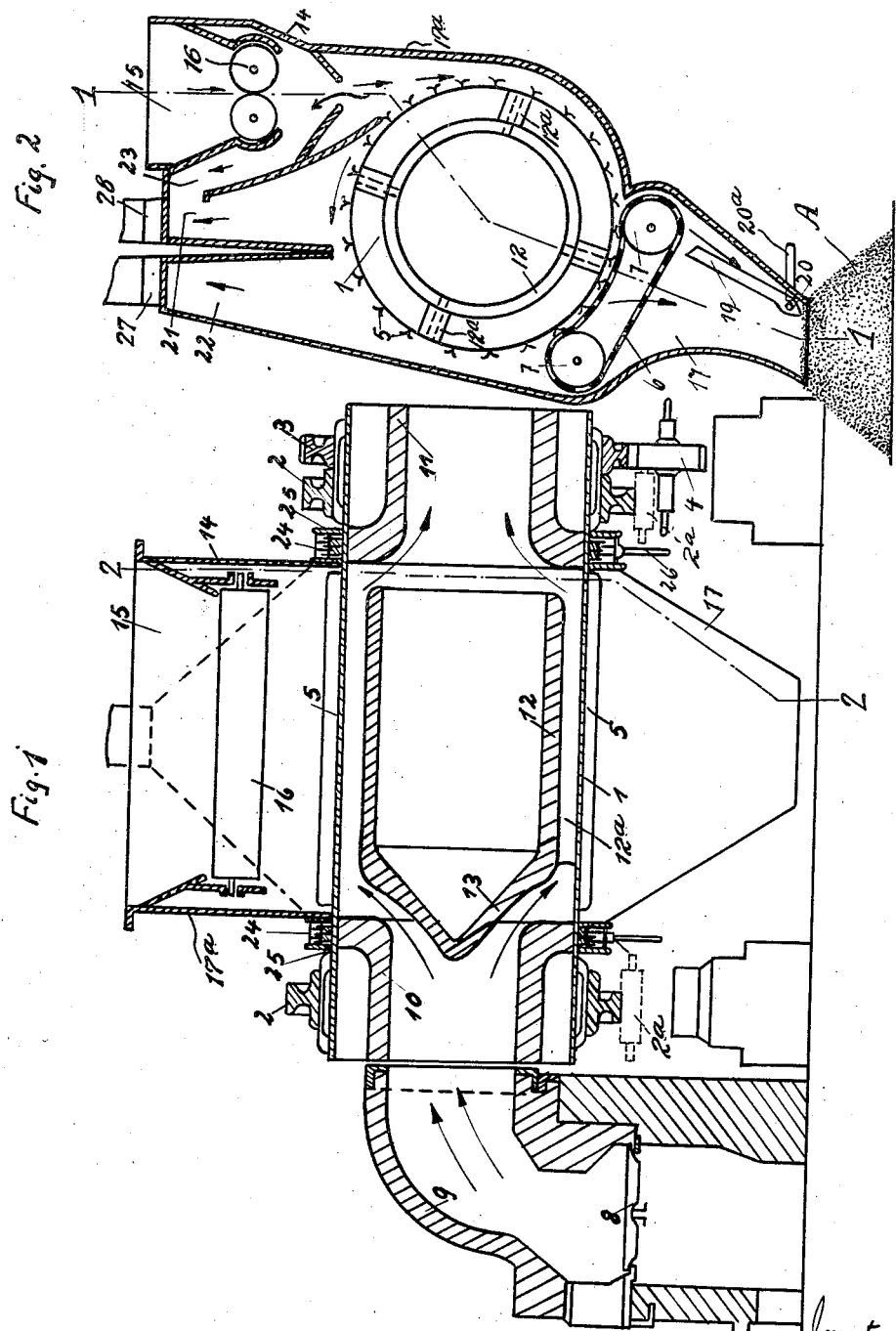

Patented July 15, 1930

1,770,636

UNITED STATES PATENT OFFICE

PETER GRAF von RADOLIN, OF RAWICZ, POLAND, ASSIGNOR TO FIRMA G. SAUERBREY MASCHINENFABRIK AKTIENGESELLSCHAFT, OF STASSFURT, GERMANY APPARATUS FOR THE DESTRUCTIVE DISTILLATION OF CEREAL HUSKS AND OTHER VEGETABLE WASTE Application filed May 19, 1923. Serial No. 640,235.

This invention is an improved process for treating the husks of rice, corn, straw, and other similar material, for the production of gas, hydrocarbons, ammonia, coke, and other useful material.

The invention consists in a process pertaining to the utilization of these materials by distilling or heating them in an air tight receptacle and thus obtaining therefrom gas, hydrocarbons such as oil and tar, ammonia and coke. The invention further relates to means for handling these very voluminous products by compressing the residual carbon or possible charcoal before exposing it to the free air and then forming the same by aid of the oil and tar or bituminous contents thereof into blocks or briquets which may readily be handled and transported.

The invention may be more fully described as follows:

The husks and similar material are introduced in a compressed state into a closed chamber, through which a stream of non-oxidizing gas is kept flowing, for instance the combustible gas produced in the distilling process. Thereby the air, which still remains in the material even after compression is driven out and flows off, together with the gas, so that thereafter the material is not liable to be burned when heated. The air is in no way detrimental to the quality of the gas for illuminating purposes as it only makes the latter somewhat less rich but not explosive, owing to the small percentage of the air.

From the first chamber, the material thus treated drops into a second air tight chamber, the bottom of which is in a continuous reciprocating or agitating movement, and blades may be attached to the said bottom so as to move the material forward through this distillation chamber. Through one or more channels at the upper part of said chamber the distilled gases, hydrocarbon vapors and ammonia are drawn off, to be cleaned and used so far as possible. The illuminating gas, or a part of it, is conducted to the first mentioned chamber for expelling the air from the raw material.

From the distillation chamber the coke falls into a third airtight chamber to be cooled before being exposed to open air. In this cooling chamber the material may be compressed by a piston or weight, and thereby its volume may be reduced to the fifth or a still smaller part of its former volume, the mere distillation not essentially reducing the volume but destroying the elasticity of the material so that after the distillation a light pressure is all that is necessary to transform the material into a very compact pulverized mass. In this condition the material is no longer liable to catch fire and may therefore now be exposed to the open air. If only a short cooling period has been had before exposure to the air a cover should be applied to the vessel containing the material until it is completely cooled.

The pulverized and cooled coke is then formed into blocks or briquets by mixing it with a part or the whole mass of the tar and pitch or the like, obtained by the distillation. Special good results can be obtained by compounding ten to twenty percent of such cementing mass with the coke. Furthermore this tar-like product is especially adapted for cementing purposes by being distilled from the whole tar mass between certain temperatures, which according to the qualities of the different materials may be so chosen as to give the blocks or briquets sufficient resistance against being liquefied by the air temperature on one hand, the cementing quality being on the other hand amply sufficient to prevent crumbling of the blocks or briquets.

An apparatus for distilling the material by the new process is shown in the drawing, in which Figure 1 is a longitudinal sectional view of the same on planes indicated by the line 1—1 of Figure 2.

Figure 2 is a transverse sectional view of the same on the plane indicated by the line 2—2 of Figure 1.

The heated surface is a rotary drum 1 which by supporting rings 2 is held on supporting rollers of usual type indicated at 2ª and a toothed ring 3 is provided in engagement with a gear 4, driven by any suitable source of power. The drum is provided on its outer face with blades or ledges 5 which in both circumferential directions are bent so as to form pockets between them which serve to hold the material over a great part of the circumference of the drum. A belt 6 of tight woven wire gauze stretching over rollers 7 is applied to the lower surface of the drum in such manner as to enable the material to remain in close contact with the heated surface for the greatest possible duration, the falling thereof being delayed as long as possible.

For heating the drum at the end a furnace 8 is connected to its inner space by a curved flue 9 which leads to an inlet channel 10 of the drum, an outlet channel 11 being at the other end. In its central part the drum contains a core 12 with a conical cap 13 at one end for the purpose of effectively causing the heated gases to approach the inner circumference of the heated drum. The parts 10 to 13 are rotatable, together with the drum. As here shown the core 12 is connected to the drum by longitudinally arranged ribs 12ª which are secured in spaced relation to one another.

At the lower part of the ascending side of the drum an inlet casing 14 is applied. Inside the inlet mouth 15 of this casing a pair of rollers 16 are rotatably placed and driven by a motor. The material to be distilled is thereby introduced into the casing 14 under a pressure between the rollers 16, which press the material into a thin sheet so that the air carried by the material is driven out and prevented from entering the casing.

The drum, the rollers 16, the part 15, the belt 6 and the rollers 7 are arranged in a casing 17ª which is provided at its lower side with an outlet 17. The discharge end of said outlet is when the apparatus is in operation buried in a heap of the discharged material as is indicated at A in Figure 2 and is thus rendered gas tight so that combustion of material in the apparatus is prevented. A beater 19 is secured on a shaft 20 and by means of a crank 20ª may be turned alternately in opposite directions so as to impart oscillatory movement to the beater and cause the same to strike against the opposing side of the wall of the outlet 17. Material falling from the belt 6 is pulverized between said casing face and said beater so as to become a compact mass before it is exposed to the open air. The walls of said outlet 17 may be surrounded by a water cooling mantle for further securing the material against being burned at the moment of exposure to the air.

Round the upper side of the drum 1 a distillation chamber is formed by two casings 21 and 22 forming the outlets for the gases produced by the distillation. One such casing is sufficient, if all the distillation products are to be drawn off commonly for being later separated from each other, but more such casings may be provided if the whole separation is to be immediately effected from the differently heated circumferential parts of the drum. A channel 23 connects the top part of the inlet casing 14 to the gas outlet 21, so that a current of generated gas passes from the drum through the entering material and escapes, together with the air contained in said material through the channel 23 and to the gas outlet casing 21. Thereby the entering material is freed from air and secured against being partly burned while being heated. Simultaneously the hot gas heats the entering material thus accelerating the distillation very effectively.

An air tight joint between the rotating drum and the edges of the whole casing is formed by a plurality of rings 24 and 25 fastened to the said parts respectively and engaging between each other. At the lowest points of every one of these said ring systems pipes 26 are attached which are fed with non-oxidizing gas under more than atmospheric pressure. For instance a part of the distillation gas may be introduced into these pipes by a pump. Thereby even in the case of a sub-atmospheric pressure arising in the distillation chamber no outer air is allowed to enter, but a regulated quantity of distillation gas enters, and combustion of the husks or generating an explosive air and gas mixture is avoided.

The operation of the apparatus may be understood without further explanation according to the above given description of the working process.

Having thus described my invention, what I claim is:

1. Apparatus for the distillation of cereal husks and other vegetable waste comprising a casing having a hopper intake throat, a gas outlet, a passageway leading to said gas outlet and arranged at one side of the hopper throat, said casing also having an outlet passage at its lower side, a revoluble drum in said casing arranged to receive material on its periphery dropped from above, and a discharge portion of said casing below said agitating means adapted to be closed by the discharged material in order to prevent the intake of air through said discharge portion of the casing.

2. An apparatus for the distillation of cereal husks and other vegetable waste, comprising an inlet chamber, a distillation chamber, a heated rotary drum in said chamber provided with longitudinal blades or ledges on its outer circumference extending in both circumferential directions to form pockets which keep the material close to the heated faces during a great part of the revolution, means for feeding the material onto the said rotary drum, a gas outlet and an opening on said distillation chamber adapted to discharge the material.

3. An apparatus for the distillation of cereal husks and other vegetable waste, comprising an inlet chamber, a distillation chamber, a pair of rotatable rollers disposed in said inlet chamber to form with the walls of the inlet chamber an airtight inlet for the material and to feed the material under compression into said distillation chamber, a heated rotary drum in said distillation chamber, the said pair of rollers being parallel to the drum of the same length, a gas outlet and an opening on said distillation chamber adapted to discharge the material.

4. An apparatus for the distillation of cereal husks and other vegetable waste, comprising an inlet chamber, a distillation chamber, a heated rotary drum in said chamber, rollers below and near to said drum, a belt stretched over said rollers applied to the lower part of said heated rotary drum and adapted to keep the material in close contact to the heated faces at the lower part of said drum, a gas outlet and an opening in said distillation chamber adapted to discharge the material.

5. An apparatus for the distillation of cereal husks and other vegetable waste, comprising a distillation chamber, a gas outlet, a heated drum in said chamber, an inlet chamber immediately connected with said distillation chamber and said gas outlet, an open communication between the bottom part of said inlet chamber and a distillation zone of said drum and means for conducting a stream of the hot distillation gas immediately through the material contained in said inlet chamber, before it reaches the heated parts of said drum, to remove the air enclosed in the material and an opening on said distillation chamber adapted to discharge the material.

6. An apparatus for the distillation of cereal husks and other vegetable waste, comprising in combination a distillation chamber, an inlet chamber, a rotary drum in said airtight chamber, means for feeding the material onto the outer surface of said rotary drum, a core held in said rotary drum, means for furnishing hot combustion gases to the space between said core and the inner circumference of said drum, a gas outlet and an opening on said airtight chamber adapted to discharge the material.

PETER GRAF von RADOLIN.